United States Patent
Yan et al.

(10) Patent No.: US 7,773,391 B2
(45) Date of Patent: Aug. 10, 2010

(54) DIRECT CURRENT TO DIRECT CURRENT CONVERTER WITH SINGLE ENDED TRANSFORMER AND PULSE REVERSE CIRCUIT

(75) Inventors: Huai-Zhu Yan, Shenzhen (CN); Tong Zhou, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 350 days.

(21) Appl. No.: 11/824,836

(22) Filed: Jul. 2, 2007

(65) Prior Publication Data
US 2008/0002437 A1 Jan. 3, 2008

(30) Foreign Application Priority Data
Jun. 30, 2006 (TW) ............................. 95123843 A

(51) Int. Cl.
*H02M 3/338* (2006.01)
(52) U.S. Cl. .................... 363/20; 363/89; 363/21.02
(58) Field of Classification Search .............. 363/20, 363/21.02, 56.11, 56.12, 21.01, 21.03, 21.04, 363/21.08, 21.1, 21.11, 15–16; 326/69, 91
See application file for complete search history.

(56) References Cited

U.S. PATENT DOCUMENTS

| 5,283,480 | A | * | 2/1994 | Usami et al. ................. 326/128 |
| 5,502,634 | A | * | 3/1996 | Lavrisa ........................ 363/101 |
| 5,663,873 | A | | 9/1997 | Bhagwat et al. |
| 6,879,499 | B2 | | 4/2005 | Matsumoto |
| 7,012,817 | B2 | * | 3/2006 | Liu et al. ........................ 363/20 |
| 2005/0269968 | A1 | * | 12/2005 | Ito et al. ....................... 315/282 |

* cited by examiner

*Primary Examiner*—Harry Behm
(74) *Attorney, Agent, or Firm*—Wei Te Chung

(57) ABSTRACT

An exemplary DC to DC converter (200) includes a first DC input (210) connected to a first DC power supply; a second DC input (220) connected to a second DC power supply; a transformer (230) including a primary winding (231), a sub-primary winding (232), and a secondary winding (233) for outputting a AC voltage; a pulse reverse circuit (260) including an input for receiving a square pulse and an output for providing the reverse square pulse; a first switch transistor (240) including a source connected to ground, a drain connected to the first DC input via the primary winding, and a gate connected to the output of the pulse reverse circuit; a second switch transistor (250) including a source connected to ground, a drain connected to ground via the sub-primary winding and a capacitor in series, and a gate connected to the output of the pulse reverse circuit.

20 Claims, 2 Drawing Sheets

DIRECT CURRENT TO DIRECT CURRENT CONVERTER WITH SINGLE ENDED TRANSFORMER AND PULSE REVERSE CIRCUIT

FIELD OF THE INVENTION

The present invention relates to DC (direct current) to DC converters, and particularly to a DC to DC converter having an pulse inverter circuit.

GENERAL BACKGROUND

DC to DC converters are frequently employed to convert relatively low voltage DC sources into high voltage DC sources. The high voltage DC source is then suitable for application to a DC load, such as electrodes of an electron tube or other electrical device.

FIG. 3 is a circuit diagram of a typical DC to DC converter. The DC to DC converter 100 includes a first DC input 110 connected to a first DC power supply (not shown), a second DC input 120 connected to a second DC power supply (not shown), a transformer 130, a first switch transistor 140, a second switch transistor 150, a pulse generator 160, and a pulse width modulation (PWM) circuit 170. The transformer 130 includes a primary winding 131, a sub-primary winding 132, and a secondary winding 133. The PWM circuit 170 includes an output 171 configured to provide a square pulse. The pulse generator 160 includes an input 161 and two outputs 162, 163. The first and second switch transistors 140, 150 are N-channel metal-oxide-semiconductor field-effect transistors (N-MOSFETs).

The first switch transistor 140 includes a source electrode "S", a drain electrode "D", and a-gate electrode "G". The source electrode "S" is connected to ground via a resistor 141. The drain electrode "D" is connected to the first DC input 110 via the primary winding 131 of the transformer 130. The gate electrode "G" is connected to the output 162 of the pulse generator 160.

The second switch transistor 150 includes a source electrode "S", a drain electrode "D", and a gate electrode "G". The source electrode "S" is connected to ground. The drain electrode "D" is connected to ground via the sub-primary winding 132 of the transformer 130 and a capacitor 151 in series. The gate electrode "G" is connected to the output 163 of the pulse generator 160.

The input 161 of the pulse generator 160 is connected to the output 171 of the PWM circuit 170 for receiving the square pulse. The pulse generator 160 generates two pulse driving signals with opposite phases according to the received square pulse, and provides the two pulse driving signals through the two outputs 162, 163 respectively.

The second DC input 120 provides operation voltages respectively to the pulse generator 160 and the PWM circuit 170.

When the pulse driving signal at the output 162 of the pulse generator 160 is a high level voltage and the pulse driving signal at the output 163 of the pulse generator 160 is a low level voltage, the first switch transistor 140 is turned on and the second switch transistor 150 is turned off. Thus a first current path is formed sequentially through the first DC input 110, the primary winding 131 of the transformer 130, the first switch transistor 140, and the resistor 141. A first current is formed when the first DC power supply provided to the first DC input 110 is connected to ground via the first current path. The first current flowing through the first current path linearly increases until the electromagnetic induction generated in the primary winding 131 reaches a predetermined maximum threshold.

When the pulse driving signal at the output 162 of the pulse generator 160 is a low level voltage and the pulse driving signal at the output 163 of the pulse generator 160 is a high level voltage, the first switch transistor 140 is turned off and the second switch transistor 150 is turned on. Thus a second current path is formed sequentially through the capacitor 151, the sub-primary winding 132 of the transformer 130, and the second switch transistor 150. Thus energy stored in the primary winding 131 of the transformer 130 transfers to the sub-primary winding 132 and discharges to ground through the second current path. Therefore a second current is formed and flows through the sub-primary winding 132 when the energy is discharged.

When current flows through the primary winding 131 or the sub-primary winding 132, electromagnetic induction at the secondary winding 133 generates an alternating current (AC) voltage between two outputs 3, 8 of the secondary winding 133. Then the AC voltage is rectified, and transformed to a DC voltage. The DC voltage is then used for driving a load circuit (not shown).

In general, the pulse generator 160 is an expensive component. Thus the cost of the DC to DC converter 100 is correspondingly high.

It is desired to provide a new DC to DC converter which can overcome the above-described deficiencies.

SUMMARY

In one preferred embodiment, a DC to DC converter includes a first DC input configured to be connected to a first DC power supply; a second DC input configured to be connected to a second DC power supply; a transformer including a primary winding, a sub-primary winding, and a secondary winding for outputting a AC (alternating current) voltage; a pulse reverse circuit including an input configured for receiving a square pulse and an output configured for providing a reverse square pulse; a first switch transistor including a source electrode connected to ground, a drain electrode connected to the first DC input via the primary winding of the transformer, and a gate electrode connected to the output of the pulse reverse circuit; and a second switch transistor including a source electrode configured for connecting to ground, a drain electrode configured for connecting to ground via the sub-primary winding and a capacitor in series, and a gate electrode configured for connecting to the output of the pulse reverse circuit.

Other novel features and advantages of the DC to DC converter will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
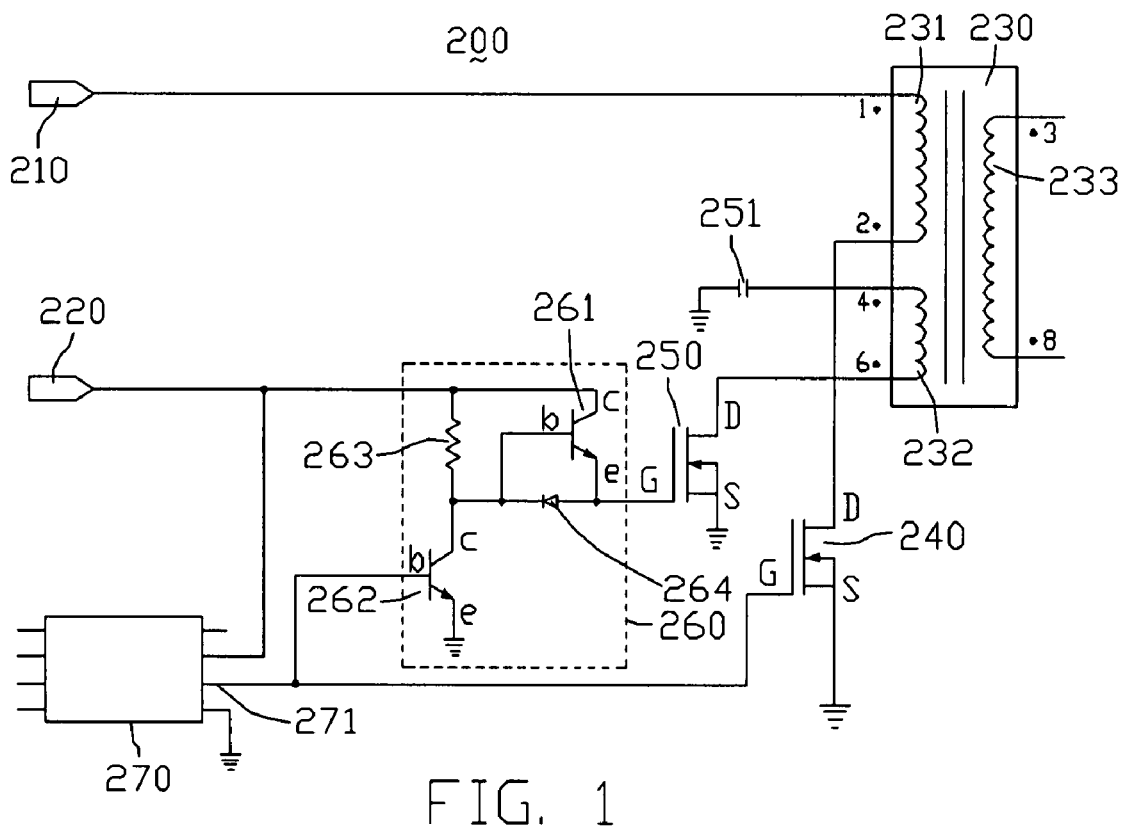
FIG. 1 is a circuit diagram of a DC to DC converter according to a first embodiment of the present invention.

FIG. 1 is a circuit diagram of a DC to DC converter according to a first embodiment of the present invention. The DC to DC converter 200 includes a first DC input 210 connected to a first DC power supply (not shown), a second DC input 220 connected to a second DC power supply (not shown), a transformer 230, a first switch transistor 240, a second switch transistor 250, a pulse reverse circuit, 260, and a PWM circuit 270. The transformer 230 includes a primary winding 231, a sub-primary winding 232, and a secondary winding 233. The PWM circuit 270 includes an output 271 configured to provide a square pulse. The pulse reverse circuit 260 includes an input (not labeled) configured to receive the square pulse, and an output (not labeled) configured to provide a reverse square pulse. The first and second transistors 240, 250 are N-channel metal-oxide-semiconductor field-effect transistors (N-MOSFETs).

The first switch transistor 240 includes a source electrode "S", a drain electrode "D", and a gate electrode "G". The source electrode "S" is connected to ground. The drain electrode "D" is connected to the first DC input 210 via the primary winding 231 of the transformer 230. The gate electrode "G" is connected to the output 271 of the PWM circuit 270.

The second switch transistor 250 includes a source electrode "S", a drain electrode "D", and a gate electrode "G". The source electrode "S" is connected to ground. The drain electrode "D" is connected to ground via the sub-primary winding 232 of the transformer 230 and a capacitor 251 in series. The gate electrode "G" is connected to the output of the pulse reverse circuit 260.

The pulse reverse circuit 260 includes a third transistor 261, a fourth transistor 262, a bias resistor 263, and a diode 264. Each of the third and fourth transistors 261, 262 is a negative-positive-negative (NPN) bipolar transistor, and includes a base electrode "b", a collector electrode "c", and an emitter electrode "e". The emitter electrode "e" of the third transistor 261 is defined as the output of the pulse reverse circuit 260. The base electrode "b" of the fourth transistor 262 is defined as the input of the pulse reverse circuit 260. A resistance of the bias resistor 263 is preferably 5.1Ω (ohms).

The collector electrode "c" of the third transistor 261 is connected to the second DC input 220. The emitter electrode "e" of the third transistor 261 is connected to the gate electrode "G" of the second switch transistor 250. The base electrode "b" of the third transistor 261 is connected to the collector electrode "c" of the fourth transistor 262.

A negative electrode of the diode 264 is connected to the collector electrode "c" of the fourth transistor 262. A positive electrode of the diode 264 is connected to the emitter electrode "e" of the third transistor 261.

The collector electrode "c" of the fourth transistor 262 is connected to the second DC input 220 via the bias resistor 263. The emitter electrode "e" of the fourth transistor 262 is connected to ground. The base electrode "b" of the fourth transistor 262 is connected to the output 271 of the PWM circuit 270.

The second DC input 220 provides operation voltages respectively to the pulse reverse circuit 260 and the PWM circuit 270. Each of the first and the second DC power supplies is preferably a 12V (volts) DC power supply.

When the output 271 of the PWM circuit 270 is a high level voltage, the first switch transistor 240 is turned on. Thus a first current path is formed sequentially through the first DC input 210, the primary winding 231 of the transformer 230, and the first switch transistor 240. A first current is formed when the first DC power supply provided to the first DC input 210 is connected to ground via the first current path. The first current flowing through the first current path linearly increases until the electromagnetic induction generated in the primary winding 231 reaches a predetermined maximum threshold.

At the same time, because the output 271 of the PWM circuit 270 is a high level voltage, the fourth transistor 262 is turned on. Therefore the gate electrode "G" of the second switch transistor 250 is connected to ground via the diode 264 and the activated fourth transistor 262. Thus the second switch transistor 250 is turned off.

When the output 271 of the PWM circuit 270 is a low level voltage, the first switch transistor 240 is turned off. At the same time, the fourth transistor 262 is turned off. Therefore the base electrode "b" of the third transistor 261 is connected to the second DC input 220, and the third transistor 261 is turned on. Accordingly, the gate electrode "G" of the second switch transistor 250 is connected to the second DC input 220 via the activated third transistor 261, and the second switch transistor 250 is turned on. Thus a second current path is formed through the capacitor 251, the sub-primary winding 232 of the transformer 230, and the second switch transistor 250. Energy stored in the primary winding 231 of the transformer 230 transfers to the sub-primary winding 232 and discharges to ground through the second current path. Therefore a second current is formed and flows through the sub-primary winding 232 when the energy is discharged.

When current flows through the primary winding 231 or the sub-primary winding 232, electromagnetic induction at the secondary winding 233 generates an AC voltage between the two outputs 3, 8 of the secondary winding 233. Then the AC voltage is rectified, and transformed to a DC voltage. The DC voltage is then used for driving a load circuit (not shown).

The DC to DC converter 200 does not include a pulse generator, and instead utilizes the pulse reverse circuit 260. In general, the cost of the pulse reverse circuit 260 is less than that of a pulse generator. Therefore the cost of the DC to DC converter 200 is correspondingly reduced.

Figure 2:
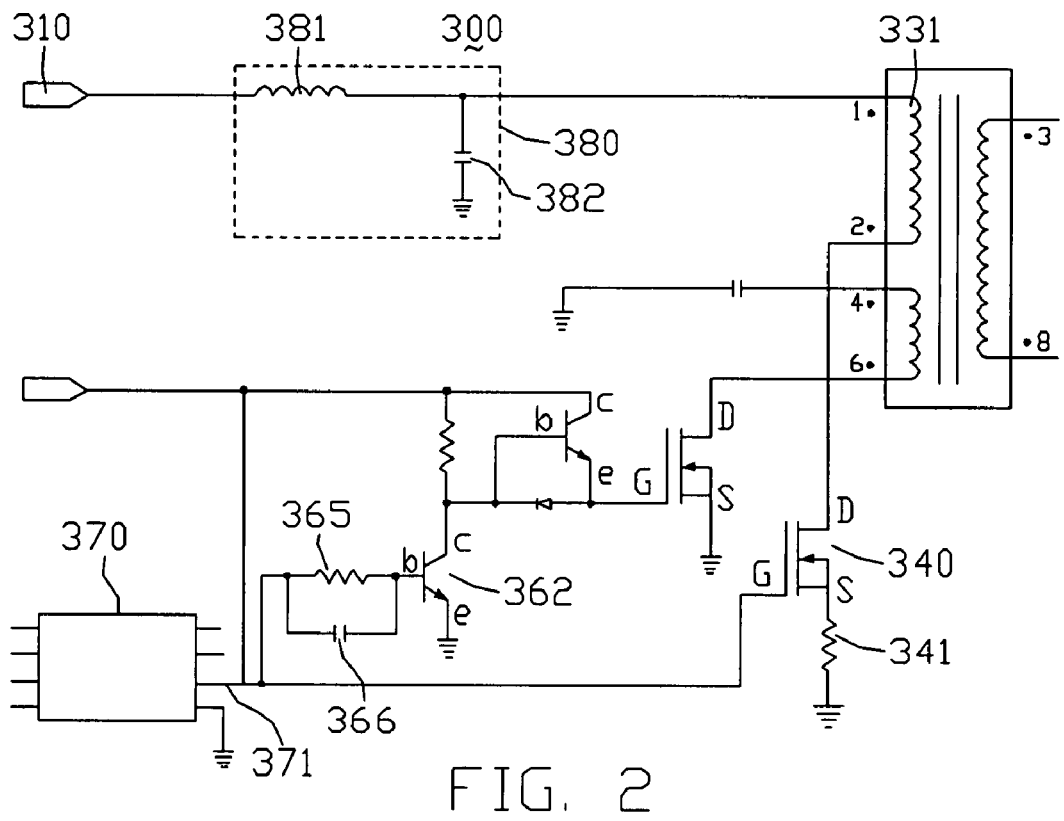
FIG. 2 is a circuit diagram of a DC to DC converter according to a second embodiment of the present invention.
Figure 3:
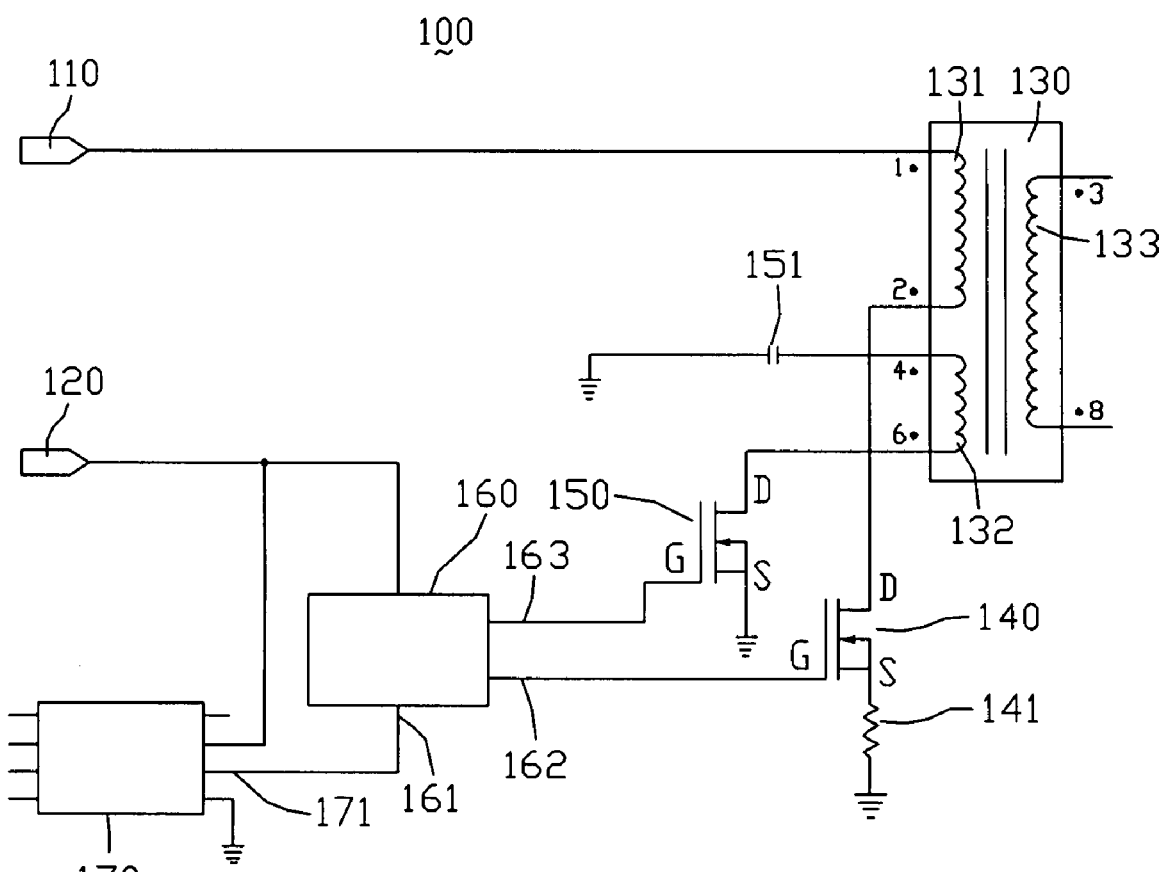
FIG. 3 is a circuit diagram of a conventional DC to DC converter.

FIG. 2 is a diagram of a DC to DC converter 300 according to a second embodiment of the present invention. The DC to DC converter 300 is similar to the above-described DC to DC converter 200. However, a unique characteristic of DC to DC converter 300 is that it further includes a filter circuit 380, a current limiting resistor 341, a discharging resistor 365, and a discharging capacitor 366.

The filter circuit 380 includes an inductance 381 and a filter capacitor 382. The filter circuit 380 is connected between a first DC input 310 and a primary winding 331. An electrical connecting node between the inductance 381 and the primary winding 331 is connected to ground via the filter capacitor 382.

A source electrode "S" of a first switch transistor 340 is connected to ground via the current limiting resistor 341. A resistance of the current limiting resistor 341 is preferably 0.22Ω.

The discharging resistor 365 and the discharging capacitor 366 are connected in parallel between a base electrode "b" of a fourth transistor 362 and an output 371 of a PWM circuit 370. The discharging resistor 365 and the discharging capacitor 366 reduce the time taken for the fourth transistor 362 to switch from on to off. A resistance of the discharging resistor 365 is preferably 3.9Ω. A capacitance of the discharging capacitor 366 is preferably 1800 pF (picofarads).

It is to be understood, however, that even though numerous characteristics and advantages of the preferred embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A direct current (DC) to DC converter comprising:
   a first DC input configured to be connected to a first DC power supply;
   a second DC input configured to be connected to a second DC power supply;
   a transformer comprising a primary winding, a sub-primary winding, and a secondary winding for outputting an alternating current (AC) voltage;
   a pulse reverse circuit comprising an input configured for receiving a square pulse, and an output configured for providing a reverse square pulse;
   a first switch transistor comprising a source electrode connected to ground, a drain electrode connected to the first DC input via the primary winding of the transformer, and a gate electrode for receiving the square pulse; and
   a second switch transistor comprising a source electrode connected to ground, a drain electrode connected to ground via the sub-primary and a capacitor in series, and a gate electrode connected to the output of the pulse reverse circuit;
   wherein the pulse reverse circuit comprises a third transistor, a fourth transistor, a bias resistor and a diode, a collector electrode of the third transistor being connected to the second DC input, an emitter electrode of the third transistor being connected to the gate electrode of the second switch transistor, a base electrode of the third transistor being connected to a collector electrode of the fourth transistor, the collector electrode of the fourth transistor being connected to the second DC input via the bias resistor, an emitter electrode of the fourth transistor being configured to be connected to ground, and a base electrode of the fourth transistor configured for receiving the square pulse, a positive electrode of the diode connected to the emitter electrode of the third transistor, and a negative electrode of the diode connected to the collector electrode of the fourth transistor.

2. The DC to DC converter as claimed in claim 1, further comprising a current limiting resistor connected between the source electrode of the first switch transistor and ground.

3. The DC to DC converter as claimed in claim 2, wherein a resistance of the current limiting resistor is approximately 0.22Ω.

4. The DC to DC converter as claimed in claim 1, wherein the emitter electrode of the third transistor is defined as the output of the pulse reverse circuit, and the base electrode of the fourth transistor is defined as the input of the pulse reverse circuit.

5. The DC to DC converter as claimed in claim 1, wherein a resistance of the bias resistor is approximately 5.1Ω.

6. The DC to DC converter as claimed in claim 1, further comprising a discharging resistor and a discharging capacitor connected in parallel, wherein the base electrode of the fourth transistor is configured for receiving the square pulse via the discharging resistor and the discharging capacitor.

7. The DC to DC converter as claimed in claim 6, wherein a resistance of the discharging resistor is approximately 3.9Ω.

8. The DC to DC converter as claimed in claim 6, wherein a capacitance of the discharging capacitor is approximately 1800 pF.

9. The DC to DC converter as claimed in claim 1, further comprising a filter circuit connected between the first DC input and the primary winding.

10. The DC to DC converter as claimed in claim 9, wherein the filter circuit comprises an inductance and a filter capacitor, and a node between the inductance and the primary winding is connected to ground via the filter capacitor.

11. The DC to DC converter as claimed in claim 1, wherein each of the first and the second DC power supplies is a 12V DC power supply.

12. The DC to DC converter as claimed in claim 1, wherein the first and second switch transistors are N-channel metal-oxide-semiconductor field-effect transistors (N-MOSFETs).

13. The DC to DC converter as claimed in claim 1, wherein the third and fourth transistors are negative-positive-negative (NPN) bipolar transistors.

14. The DC to DC converter as claimed in claim 1, further comprising a pulse width modulation (PWM) circuit, the PWM circuit comprising an output configured for providing the square pulse.

15. A direct current (DC) to DC converter comprising:
   a first DC input configured to be connected to a first DC power supply;
   a second DC input configured to be connected to a second DC power supply;
   a transformer comprising a primary winding, a sub-primary winding, and a secondary winding for outputting an alternating current (AC) voltage;
   a first switch transistor comprising a source electrode connected to ground, a drain electrode connected to the first DC input via the primary winding of the transformer, and a gate electrode for receiving a square pulse;
   a second switch transistor comprising a source electrode connected to ground, a drain electrode connected to ground via the sub-primary and a capacitor in series, and a gate electrode for receiving a reverse square pulse;
   a pulse reverse circuit comprising a third transistor; a fourth transistor, a bias resistor and a diode, a collector electrode of the third transistor being connected to the second DC input, an emitter electrode of the third transistor being connected to the gate electrode of the second switch transistor to output the reverse square pulse, a base electrode of the third transistor being connected to a collector electrode of the fourth transistor, the collector electrode of the fourth transistor being connected to the second DC input via the bias resistor, an emitter electrode of the fourth transistor being configured to be connected to ground; and
   a discharging resistor and a discharging capacitor connected in parallel;
   wherein a base electrode of the fourth transistor is configured for receiving the square pulse via the discharging resistor and the discharging capacitor.

16. The DC to DC converter as claimed in claim 15, wherein a resistance of the discharging resistor is approximately 3.9Ω.

17. The DC to DC converter as claimed in claim 16, wherein a capacitance of the discharging capacitor is approximately 1800 pF.

18. The DC to DC converter as claimed in claim 15, wherein a positive electrode of the diode is connected to the emitter electrode of the third transistor, and a negative electrode of the diode is connected to the collector electrode of the fourth transistor.

19. The DC to DC converter as claimed in claim 15, further comprising a pulse width modulation (PWM) circuit, the PWM circuit comprising an output configured for providing the square pulse.

20. The DC to DC converter as claimed in claim 15, wherein the first and second switch transistors are N-channel metal-oxide-semiconductor field-effect transistors (N-MOSFETs), and the third and fourth transistors are negative-positive-negative (NPN) bipolar transistors.

* * * * *